US012581293B2

(12) United States Patent
Miyauchi et al.

(10) Patent No.: US 12,581,293 B2
(45) Date of Patent: Mar. 17, 2026

(54) DEVICE, SYSTEM, METHOD, AND PROGRAM FOR RESPONDING TO SECURITY EVENTS IN A VEHICLE WHEN WIRELESS COMMUNICATION WITH A SECURITY CENTER CANNOT BE PERFORMED

(71) Applicants: TOYOTA JIDOSHA KABUSHIKI KAISHA, Toyota (JP); DENSO CORPORATION, Kariya-city (JP)

(72) Inventors: Kunihiro Miyauchi, Toyota (JP); Takeshi Sugashima, Kariya-city (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 755 days.

(21) Appl. No.: 17/884,080

(22) Filed: Aug. 9, 2022

(65) Prior Publication Data

US 2023/0075593 A1     Mar. 9, 2023

(30) Foreign Application Priority Data

Sep. 9, 2021    (JP) ................................. 2021-147082

(51) Int. Cl.
*H04W 12/06*      (2021.01)
*H04W 4/46*       (2018.01)

(52) U.S. Cl.
CPC ............. *H04W 12/06* (2013.01); *H04W 4/46* (2018.02)

(58) Field of Classification Search
None
See application file for complete search history.

(56) References Cited

U.S. PATENT DOCUMENTS

| | | | |
|---|---|---|---|
| 9,173,100 B2 * | 10/2015 | Ricci ................... | H04W 12/125 |
| 11,303,661 B2 * | 4/2022 | Galula ................. | H04L 63/123 |
| 2003/0067542 A1 * | 4/2003 | Monroe ................ | H04N 7/181 |
| | | | 348/E7.086 |
| 2013/0203400 A1 * | 8/2013 | Ricci ................. | H04M 1/72463 |
| | | | 455/418 |
| 2021/0237665 A1 * | 8/2021 | Tamura ................ | G06F 21/554 |
| 2021/0344700 A1 | 11/2021 | Ueno et al. | |
| 2022/0094540 A1 | 3/2022 | Kurachi et al. | |

FOREIGN PATENT DOCUMENTS

| | | |
|---|---|---|
| CN | 113273144 A | 8/2021 |
| JP | 2014-234100 A | 12/2014 |
| JP | 2019-125344 A | 7/2019 |
| JP | 2020-119090 A | 8/2020 |

* cited by examiner

*Primary Examiner* — Adolf Dsouza
(74) *Attorney, Agent, or Firm* — OLIFF PLC

(57) ABSTRACT

An information processing device, comprising a processor, wherein the processor is configured to: acquire security event information for a vehicle from another information processing device installed in the vehicle; and in cases in which wireless communication with a security center cannot be performed, notify a destination inside the vehicle of at least one of a response instruction, which is predetermined according to the security event information, or the security event information.

23 Claims, 10 Drawing Sheets

FIG.4

| ITEM NAME | ROLE |
|---|---|
| PROTOCOL VERSION | VERSION OF THE SECURITY EVENT INFORMATION TRANSMISSION PROTOCOL |
| PROTOCOL HEADER | SPECIFYING THE PRESENCE/ABSENCE OF PARTICULAR ITEM OF SECURITY EVENT INFORMATION |
| INSTANCE ID | ID EMPLOYED IN SECURITY EVENT DISCRIMINATION |
| SENSOR INSTANCE ID | ID OF SECURITY EVENT TRANSMISSION ORIGINATOR |
| EVENT DEFINITION ID | ID OF TYPE OF SECURITY EVENT |
| COUNT | AGGREGATE COUNT WHEN PLURAL EVENTS OCCURRING IN SHORT TIME PERIOD ARE AGGREGATED AND TRANSMITTED |
| TIMESTAMP | INFORMATION ABOUT TIME OF SECURITY EVENT OCCURRENCE |
| CONTEXT DATA | DETAILED INFORMATION ABOUT SECURITY EVENT |
| SIGNATURE | SIGNATURE OR AUTHENTICATION CODE |

FIG.6

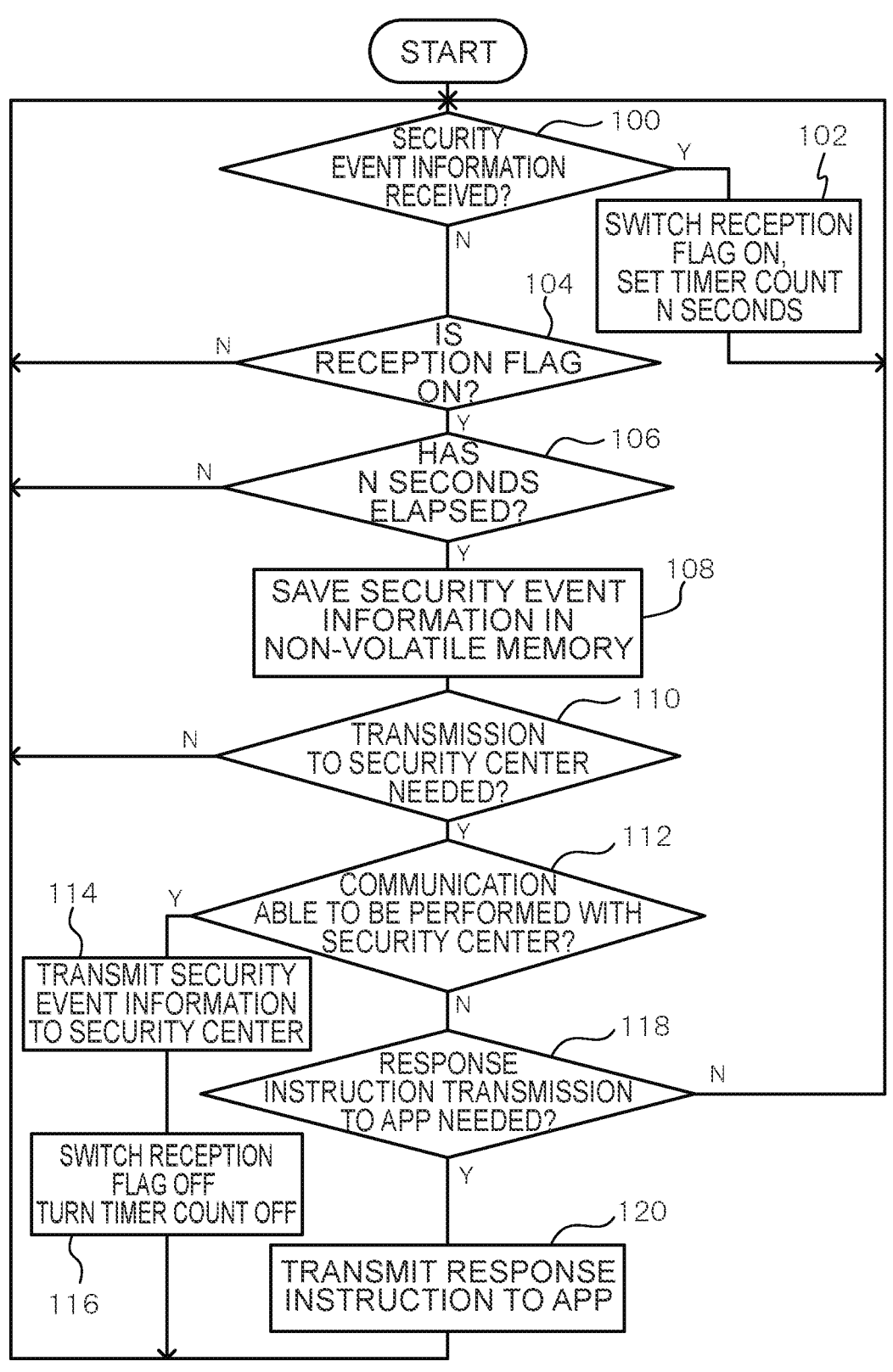

START

100 SECURITY EVENT INFORMATION RECEIVED?

Y → 102 SWITCH RECEPTION FLAG ON, SET TIMER COUNT N SECONDS

N

104 IS RECEPTION FLAG ON? N →

Y

106 HAS N SECONDS ELAPSED? N →

Y

108 SAVE SECURITY EVENT INFORMATION IN NON-VOLATILE MEMORY

110 TRANSMISSION TO SECURITY CENTER NEEDED? N →

Y

112 COMMUNICATION ABLE TO BE PERFORMED WITH SECURITY CENTER?

Y → 114 TRANSMIT SECURITY EVENT INFORMATION TO SECURITY CENTER

N

118 RESPONSE INSTRUCTION TRANSMISSION TO APP NEEDED? N →

Y

116 SWITCH RECEPTION FLAG OFF TURN TIMER COUNT OFF

120 TRANSMIT RESPONSE INSTRUCTION TO APP

FIG.7

| NO. | SECURITY EVENT 1 | SECURITY EVENT 2 | SECURITY EVENT 3 | ... | SECURITY EVENT N | DANGER LEVEL | TRANSMISSION DESTINATION APP |
|---|---|---|---|---|---|---|---|
| 1 | Sensor Instance ID:1<br>Event Definition ID:2<br>Context Data:ABCD | - | - | : | | 5 | APP A |
| 2 | Sensor Instance ID:1<br>Event Definition ID:2 | Sensor Instance ID:2<br>Event Definition ID:2 | Sensor Instance ID:3<br>Event Definition ID:2 | : | | 2 | APP A + APP B |
| 3 | Sensor Instance ID:1<br>Event Definition ID:2 | Sensor Instance ID:2<br>Event Definition ID:3 | - | : | | 1 | NONE |
| ・・・ | ・・・ | ・・・ | ・・・ | : | ・・・ | ・・・ | ・・・ |
| N | ・・・ | ・・・ | ・・・ | : | ・・・ | ・・・ | ・・・ |

DEVICE, SYSTEM, METHOD, AND PROGRAM FOR RESPONDING TO SECURITY EVENTS IN A VEHICLE WHEN WIRELESS COMMUNICATION WITH A SECURITY CENTER CANNOT BE PERFORMED

CROSS-REFERENCE TO RELATED APPLICATION

This application is based on and claims priority under 35 USC 119 from Japanese Patent Application No. 2021-147082 filed on Sep. 9, 2021, the disclosure of which is incorporated by reference herein

BACKGROUND

Technical Field

The present disclosure relates to an information processing device for processing information of a vehicle, and to an information processing system, an information processing method, and a recording medium storing an information processing program of the same.

Related Art

There is technology for collecting security events that have occurred in ECUs installed in a vehicle. In technology hitherto, security event information is notified to a security center by wireless communication according to the content of the collected security events. A danger level is then determined at the security center based on the notified security event information and, in cases in which the vehicle is determined to be in a dangerous state, a command to stop a particular function is issued to the vehicle in order to avoid the dangerous state.

For example, in Japanese Patent Application Laid-Open (JP-A) No. 2020-119090 there is a proposal for a vehicle security monitoring device that acquires log data transmitted from an onboard network, that detects any log data expressing an abnormal operation by finding a correlation between the acquired log data and threat information, and then estimates a range affected by the abnormal operation, a degree of danger and a type and/or cause of the threat based on the abnormal operation detection information. The vehicle security monitoring device then selects a vehicle to be notified with a response instruction based on the results of such estimation, and transmits the response instruction to the selected vehicle.

Such a vehicle security monitoring device enables security measures to be executed based on log data transmitted from the onboard network.

However, in JP-A No. 2020-119090 the security event information is unable to be notified to the security center in cases in which the wireless function of the vehicle is broken, or cases in which the vehicle is in a radio wave blind spot, such as underground. There is accordingly a concern that appropriate commands would be unable to be issued and the security events would be unable to be addressed.

SUMMARY

In consideration of the above circumstances, an object of the present disclosure is to provide an information processing device capable of responding to security events even in a situation where wireless communication is unable to be performed with the security center, and to provide an information processing system, an information processing method, and a recording medium storing an information processing program of the same.

In order to achieve such an object, an information processing device of a first aspect includes an acquisition section configured to acquire security event information of a vehicle from another information processing device installed in the vehicle, and a notification section configured to, in cases in which wireless communication is unable to be performed with a security center, notify a destination inside the vehicle of at least one out of a response instruction predetermined according to the security event information, or the security event information.

In the first aspect of the present disclosure, the acquisition section acquires the security event information of the vehicle from the other information processing device installed to the vehicle.

The notification section then, in cases in which wireless communication is unable to be performed with the security center, notifies the destination inside the vehicle of the at least one out of the response instruction predetermined according to the security event information, or the security event information.

This thereby enables the destination inside the vehicle to be notified of the at least one out of the response instruction according to the security event information, or the security event information, even in cases in which communication is unable to be performed with the security center, hence enabling avoidance of a dangerous state related to security.

Note that the information processing device itself and the other information processing device may be applied to electronic control units installed in a vehicle.

Moreover, the information processing device may further include a first determination section configured to determine whether or not to transmit the security event information acquired by the acquisition section to the security center, and the notification section may notify the destination inside the vehicle of the at least one in cases in which wireless communication is unable to be performed with the security center when determined by the first determination section to transmit the security event information to the security center.

Moreover, the acquisition section may acquire plural of the security event information from plural of the other information processing devices, and the first determination section may determine whether or not to transmit the security event information to the security center based on the plural security event information.

Moreover, the information processing device may further include a confirmation section configured to check an ability to perform wireless communication with the security center in cases in which determination has been made by the first determination section to transmit the security event information.

Moreover, the information processing device may further include a transmission section configured to transmit the security event information to the security center in cases in which determination has been made by the first determination section to transmit the security event information.

Moreover, the transmission section may transmit the security event information via an electronic control unit including a wireless communication function.

Moreover, the information processing device may further include a second determination section configured to determine whether or not to perform notification by the notification section in cases in which wireless communication is unable to be performed with the security center.

Moreover, the second determination section may use a number of attack times in determination.

Moreover, the second determination section may use a communication non-execution duration with the security center in determination.

Moreover, the notification section may notify one of the other information processing devices other than the other information processing device that issued the security event information of the at least one.

Moreover, the information processing device may further include an authentication code appending section configured to append an authentication code to the at least one when the notification section is notifying the at least one.

Moreover, the information processing device may further include a public key encryption section configured to use a public key encryption system to encrypt the at least one when the notification section is notifying the at least one.

Moreover, after the notification section has notified the at least one, the transmission section may transmit the security event information to the security center in cases in which wireless communication has become possible with the security center.

Moreover, after the notification section has notified the at least one, the transmission section may further transmit information indicating response processing executed in cases in which wireless communication has become possible with the security center.

Moreover, the information processing device may further include a cancel notification section configured to receive response instruction information corresponding to the security event information from the security center, and to cancel the response instruction and notify the response instruction information in cases in which the received response instruction information differs from the response instruction.

Moreover, the information processing device may further include a detection section configured to detect for tampering with the electronic control unit including the wireless communication function in cases in which communication has reopened with the security center.

Moreover, the detection section may detect for the tampering in cases in which a duration communication is unable to be performed with the security center is a predetermined duration or greater.

Note that an information processing system may include plural control devices installed to a vehicle, and the plural control devices may cooperate with each other to acquire information about a security event that occurred in the vehicle and, in cases in which wireless communication is unable to be performed with a security center, to perform processing to notify a destination inside the vehicle of at least one out of a response instruction predetermined according to the security event information, or the security event information.

Moreover, in an information processing method a computer may perform processing to acquire security event information of a vehicle from another information processing device installed in the vehicle and, in cases in which wireless communication is unable to be performed with a security center, to notify a destination inside the vehicle of at least one out of a response instruction predetermined according to the security event information, or the security event information.

Furthermore, in an information processing method a computer may perform processing to acquire security event information of a vehicle from another information processing device installed in the vehicle and, in cases in which wireless communication is unable to be performed with a security center, to notify a destination inside the vehicle of at least one out of a response instruction predetermined according to the security event information, or the security event information.

The present disclosure as described above enables provision of an information processing device capable of responding to security events even in a situation where wireless communication is unable to be performed with the security center, and provision of an information processing system, an information processing method, and a recording medium storing an information processing program of the same.

BRIEF DESCRIPTION OF THE DRAWINGS

An exemplary embodiment of the present disclosure will be described in detail based on the following figures, wherein:

FIG. 4 is a diagram illustrating information containing security event information;

FIG. 6 is a flowchart illustrating an example of a flow of processing performed in an information processing system according to the present exemplary embodiment when a security monitoring app has received security event information;

FIG. 7 is a diagram illustrating determination conditions for a danger level of security event information;

DETAILED DESCRIPTION

Figure 1:
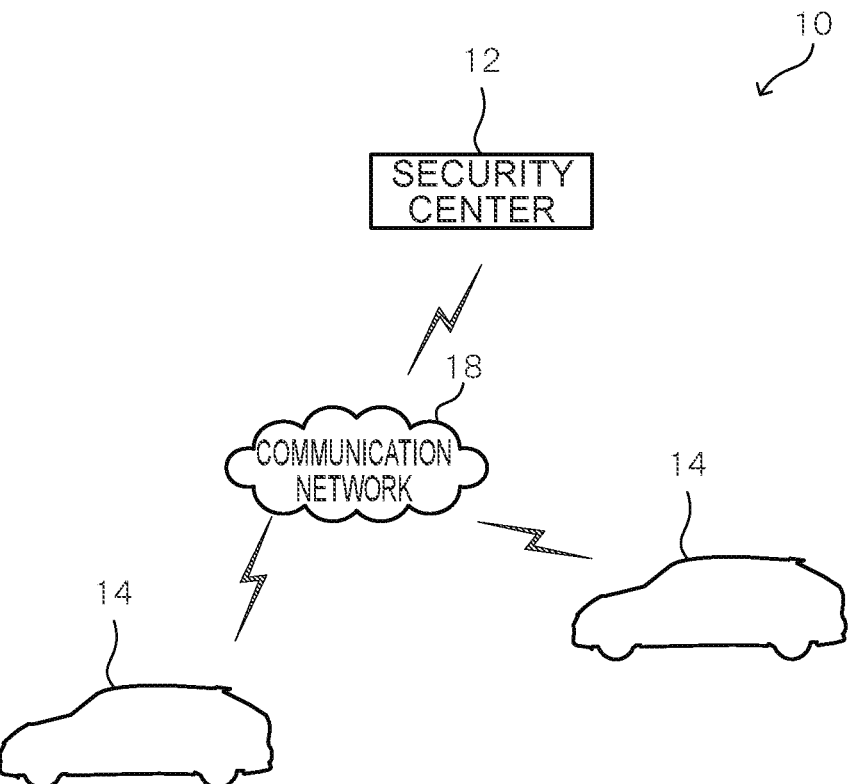
FIG. 1 is a diagram illustrating a schematic configuration of an information processing system according to an exemplary embodiment.

Detailed explanation follows regarding an example of an exemplary embodiment of the present disclosure, with reference to the drawings. FIG. 1 is a diagram illustrating a schematic configuration of an information processing system according to the present exemplary embodiment.

An information processing system 10 according to the present exemplary embodiment, as illustrated in FIG. 1, includes vehicles 14 and a security center 12, connected together over a communication network 18. The information processing system 10 according to the present exemplary embodiment collects in each of the vehicles 14 information about security events occurring in various electronic control units (ECU) installed in the vehicle 14, and transmits the security event information to the security center 12 when there is a need to notify the security center 12. The security center 12 determines a response content based on the security event information transmitted from the vehicle 14, and replies with response instructions to the vehicle 14.

Figure 2:
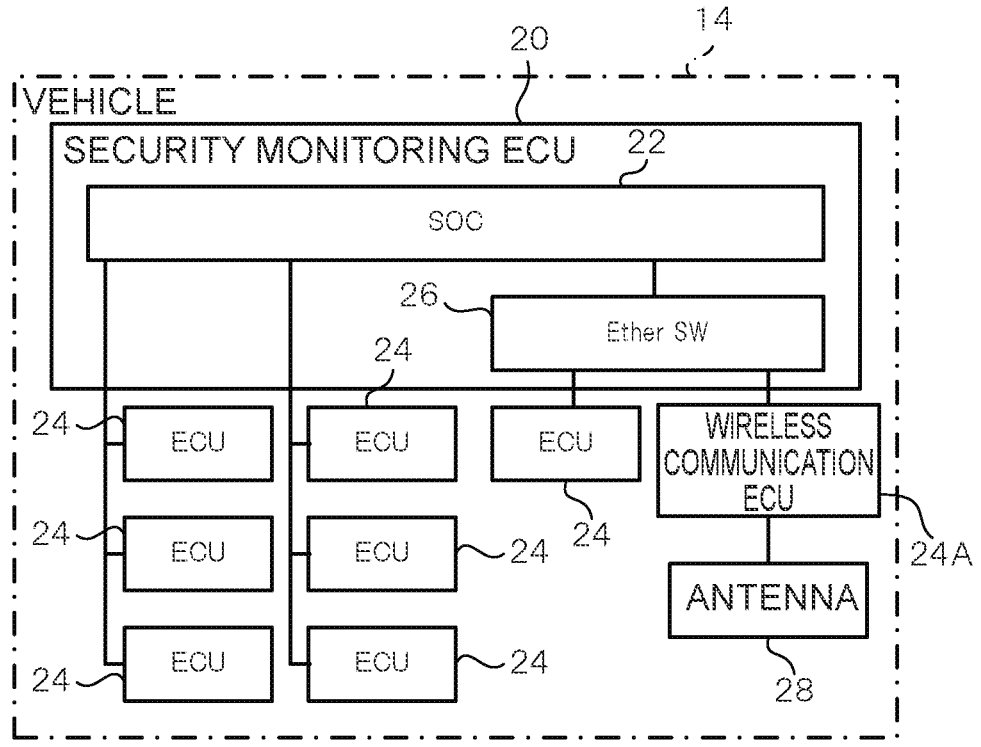
FIG. 2 is a block diagram illustrating an example of a configuration inside a vehicle of an information processing system according to the present exemplary embodiment.

FIG. 2 is a block diagram illustrating an example of a configuration inside the vehicle 14 of the information processing system 10 according to the present exemplary embodiment.

The vehicle 14 is, as illustrated in FIG. 2, provided with plural ECUs 24 serving as examples of electronic control units and including a security monitoring ECU 20 serving as an example of an information processing device.

The security monitoring ECU 20 is configured including a system on chip (SOC) 22 and an Ether SW 26. The SOC 22 includes a central processing unit (CPU) function, a memory function, and a communication interface function. The plural ECUs 24 are connected to the SOC 22. Some of the plural ECUs 24 are connected to the SOC 22 via the Ether SW 26. The CPU is an example of a processor.

Examples of the ECUs 24 connected to the SOC 22 include an ECU for controlling drive of the vehicle 14, an ECU for controlling braking thereof, an ECU for controlling steering thereof, an ECU for controlling air-conditioning thereof, and an ECU for controlling safety devices thereof.

An example of the ECUs 24 connected to the SOC 22 via the Ether SW 26 include a multimedia ECU for controlling plural media, such as text, audio, still photographs, video, and the like, an intelligent transport systems (ITS) ECU for performing exchange of information between people, the road, and the vehicle 14 to control traffic safety, congestion countermeasures, environmental countermeasures, and the like, and a wireless communication ECU 24A for wireless communication outside the vehicle through an antenna 28.

The connection between the security monitoring ECU 20 and the plural ECUs 24 may be by physical line, so as to enable communication via one or more ECU 24 from out of the plural ECUs 24.

The security monitoring ECU 20 collects information about security events that have occurred in the ECUs 24 in the vehicle 14, and determines the danger level according to the information content. Depending on the danger level, the security center 12 is notified of the security event information by wireless communication. The security center 12 determines the danger level based on this notification result, and in cases in which it has been determined that the vehicle 14 is in a dangerous state, issues a command to the vehicle 14, such as to stop a particular function, in order to avoid the dangerous state.

Figure 3:
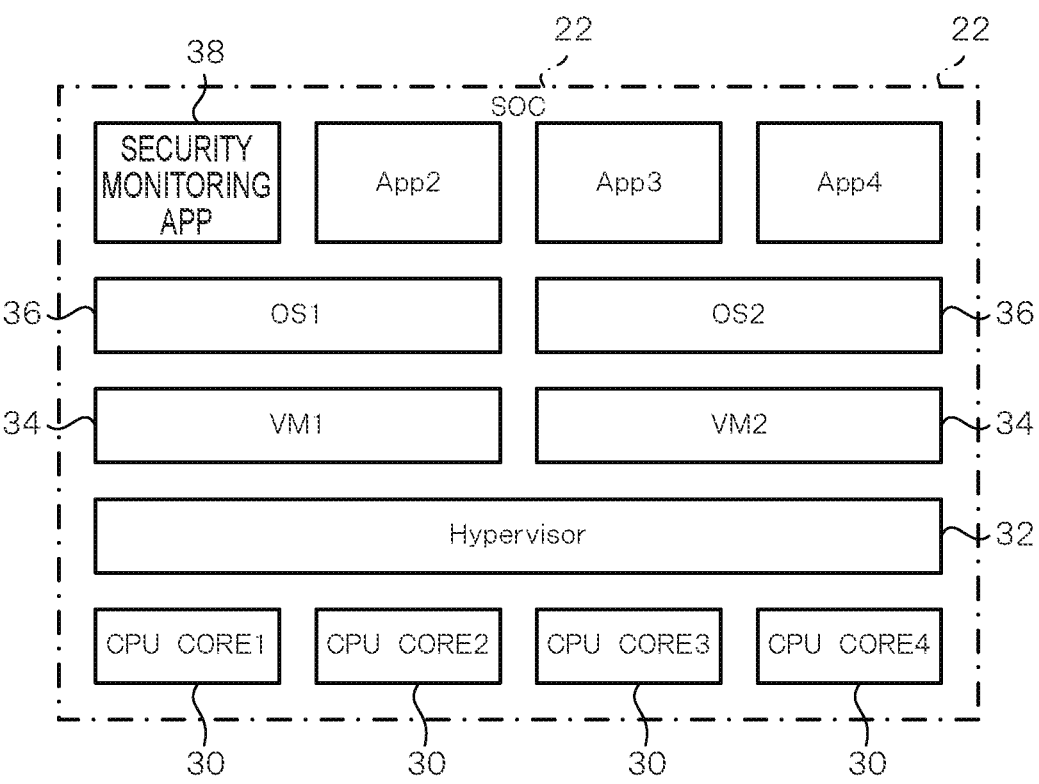
FIG. 3 is a block diagram illustrating a software structure of a SOC of a security monitoring ECU.

FIG. 3 is a block diagram illustrating a software structure of the SOC 22 of the security monitoring ECU 20.

There are plural CPU cores 30 present inside the SOC 22 (4 cores in the example of FIG. 3; CPU core 1 to CPU core 4), and the physical CPU cores 30 are virtualized through a hypervisor 32 and arranged as virtual machines (VM) 34. There are two VMs 34 illustrated in FIG. 3, VM 1 and VM 2. Operating systems (OS) 36 are arranged above the VMs 34, and applications (four applications in FIG. 3; a security monitoring app 38 and App 2 to App 4) operate in the OS 36. The security monitoring app 38 receives security event information from the plural ECUs 24 connected to the security monitoring ECU 20. Hereafter application will be abbreviated to app.

Explanation follows regarding the security event information. FIG. 4 is a diagram illustrating information containing the security event information.

The security event information includes 9 items: a Protocol Version, a Protocol Header, an Instance ID, a Sensor Instance ID, an Event Definition ID, a Count, a Timestamp, Context Data, and a Signature.

The Protocol Version is a version of the security event information transmission protocol. The Protocol Header is an item to specify the presence/absence of a particular item of security event information. The Instance ID is an ID employed in security event discrimination. The Sensor Instance ID is an ID of a security event transmission originator. The Event Definition ID is an ID of the type of security event. The Count is an aggregate count when plural events that occur in a short period of time are aggregated and transmitted. The Timestamp is information about the time when a security event occurred. The Context Data is detailed information about a security event. The Signature is a signature or authentication code. As an example of information related to a port scan, information of a port number and of an IP address of an attack originator are included in the Context.

The ECU 24 including the security monitoring app 38 and an attack detection function that is the originator of security event transmission holds a common key. An authentication code is appended to the Signature and the common key is employed on the reception side to guarantee the completeness of the security event information. Note that the completeness of information may be guaranteed using a public key encryption system instead of a message authentication system by common key.

Figure 5:
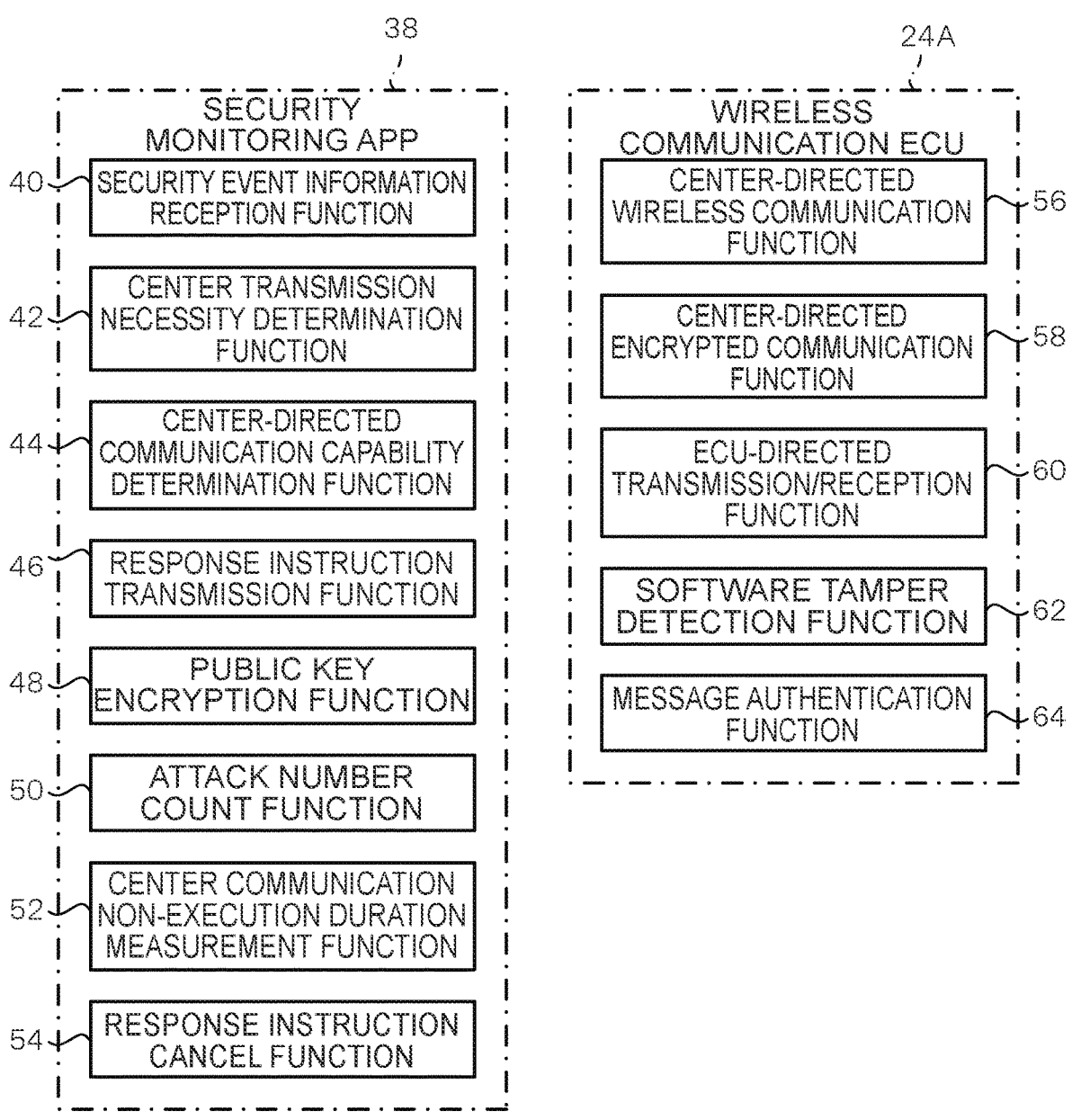
FIG. 5 is a functional block diagram illustrating functions of a security monitoring app and a wireless communication ECU.

Explanation follows regarding the function of the security monitoring app 38 and the function of the wireless communication ECU 24A. FIG. 5 is a functional block diagram illustrating the functions of the security monitoring app 38 and the functions of the wireless communication ECU 24A.

The security monitoring app 38 includes a security event information reception function 40, a center transmission necessity determination function 42, a center-directed communication capability determination function 44, a response instruction transmission function 46, a public key encryption function 48, an attack number count function 50, a center communication non-execution duration measurement function 52, and a response instruction cancel function 54. Note that the security event information reception function 40 corresponds to an example of an acquisition section, the response instruction transmission function 46 corresponds to an example of a notification section and a transmission section, and the center transmission necessity determination function 42 corresponds to an example of a first determination section and a second determination section. The center-directed communication capability determination function 44 corresponds to an example of a confirmation section, and the public key encryption function 48 corresponds to an example of an authentication code appending section and a public key encryption section. The response instruction cancel function 54 corresponds to an example of a cancel notification section. A software tamper detection function 62 corresponds to an example of a detection section.

Security event information from the plural ECUs 24 provided in the vehicle 14 is received by the security event information reception function 40.

The center transmission necessity determination function 42 determines whether or not there is a need to notify the security center 12 based on the content of the received security event information.

The center-directed communication capability determination function 44 determines whether or not communication is able to be performed between the vehicle 14 and the security center 12.

The response instruction transmission function 46 transmits the security event information to the security center 12 in cases in which it has been determined by the center transmission necessity determination function 42 that it is necessary to notify the security center 12 of the security event information. Moreover, in cases in which communication with the security center 12 is deemed impossible by the center-directed communication capability determination function 44, the response instruction transmission function 46 transmits at least one of the security event information, or a response instruction corresponding to the security event information, to this ECU 24 or an app, which are examples of a destination inside the vehicle. After transmission of the security event information to the security center 12, the response instruction transmission function 46 transmits information to the security center 12 indicating response processing that has been executed in cases in which wireless communication with the security center 12 has become possible.

In cases in which a public key encryption system is employed, the public key encryption function 48 employs a public key to encrypt related information related to the security event and including the security event information. In cases in which a message authentication system by common key is employed, a common key is employed to encrypt the related information related to the security event and including the security event information. Examples of the related information include information such as a response instruction corresponding to the security event information.

The attack number count function 50 counts a received number of times of an attack in which a security event occurs.

The center communication non-execution duration measurement function 52 measures the duration of non-execution of communication with the security center 12.

In cases in which communication with the security center 12 has been restored, the response instruction cancel function 54 cancels the response instruction corresponding to the security event information transmitted by the response instruction transmission function 46.

The wireless communication ECU 24A includes a center-directed wireless communication function 56, a center-directed encrypted communication function 58, an ECU-directed transmission/reception function 60, the software tamper detection function 62, and a message authentication function 64.

The center-directed wireless communication function 56 performs wireless communication to exchange information between the vehicle 14 and the security center 12.

The center-directed encrypted communication function 58 performs encryption and communication when communication is performed between the vehicle 14 and the security center 12.

The ECU-directed transmission/reception function 60 performs transmission/reception of information with the plural ECUs 24 provided in the vehicle 14.

The software tamper detection function 62 detects whether or not software has been overwritten or tampered with.

In order to confirm that sent information has not been tampered with during transmission, the message authentication function 64 appends message authentication information such as a common key, a public key, or the like to communication data so as to enable authentication of the communication data, and to confirm the completeness of the data.

Explanation next follows regarding operation of the information processing system 10 configured as described above, and regarding specific processing performed when the security monitoring app 38 has received security event information. FIG. 6 is a flowchart illustrating an example of a flow of processing performed in the information processing system 10 according to the present exemplary embodiment when a security monitoring app 38 has received security event information.

At step 100 the security monitoring app 38 determines whether or not security event information has been received. This determination is determination by the security event information reception function 40 as to whether or not security event information has been received. Processing transitions to step 102 in cases in which this determination is affirmative, and processing transitions to step 104 in cases in which this determination is negative.

At step 102 the security monitoring app 38 switches a reception flag ON to represent that security event information has been received, sets a timer count to a predetermined value (N seconds), and then returns to step 100 to repeat the processing described above. The present exemplary embodiment is configured such that information transmission to the security center is not performed until reception of security event information has not been performed for a given period of time, namely until an attack has subsided for the given period of time or longer.

At step 104 the security monitoring app 38 determines whether or not the reception flag is ON. Processing returns to step 100 to repeat the processing described above in cases in which this determination is negative, and processing transitions to step 106 in cases in which the determination is affirmative.

At step 106 the security monitoring app 38 determines whether or not the set timer count value of N seconds has elapsed. Processing returns to step 100 to repeat the processing described above in cases in which this determination is negative, and processing transitions to step 108 in cases in which the determination is affirmative.

At step 108 the security monitoring app 38 saves the received security event information in non-volatile memory, and then processing transitions to step 110.

At step 110, the security monitoring app 38 determines whether or not there is a need to transmit security event information to the security center 12. This determination is a determination made by the center transmission necessity determination function 42 regarding the necessity to transmit the security event information. Processing returns to step 100 to repeat the processing described above in cases in which this determination is negative, and processing transitions to step 112 in cases in which the determination is affirmative. Specifically, the danger level is determined and a determination is made as to whether or not to transmit to the security center 12 from a series of security event information received in one cycle. For example, the danger level of the security event information is determined by employing a security center determination condition as illustrated in FIG. 7. FIG. 7 is a diagram illustrating determination conditions for a danger level of the security event information. Namely, the security monitoring app 38 confirms whether or not the series of security event information received in one cycle contains any condition corresponding to conditions No. 1 to No. N. No. 1 is determination of a danger level 5 when a security event having values of a Sensor Instance ID of 1, an Event Definition ID of 2, and a Context Data of ABCD is included. Moreover, the danger level is determined from one or more security events, for example: a No. 2 determination is of a danger level 2 when security event information having values of a Sensor Instance ID of 1, and an Event Definition ID of 2 is included, when security event information having values of a Sensor Instance ID of 2 and an Event Definition ID of 2 is included, and when security event information having values of a Sensor Instance ID of 3 and an Event Definition ID of 2 is included. The sequence in which the security events occurred, as indicated by the Timestamp information, may be employed as a condition, and the number of times of attack, as indicated by the Count information, may also be employed as a condition. The danger level found by such determination is compared to a separately held and predetermined danger level threshold, and is transmitted to the security center 12 in cases in which the value has exceeded the threshold. Although in this example a condition is a comparison of danger level, there is no limitation thereto, and transmission may be made when there is an agreement with a determination condition. Moreover, danger levels may be combined for plural agreements. Moreover the determination at step 110 may be omitted, and a mode may be adopted in which all of the security event information is transmitted to the security center 12 without performing determination as to the necessity of transmission of the security event information.

At step 112 the security monitoring app 38 determines whether or not communication is able to be performed with the security center 12 in cases in which a need to transmit the security event information to the security center 12 has been determined. This determination is determination by the center-directed communication capability determination function 44 of the ability to communicate with the security center 12. Processing transitions to step 114 in cases in which this determination is affirmative, and processing transitions to step 118 in cases in which this determination is negative.

At step 114 the security monitoring app 38 transmits the security event information to the security center 12 in cases in which transmission is able to be performed to the security center 12, and then processing transitions to step 116. Note that instead of determining the ability to perform communication at step 112, a trial transmission may be made, and then determination of transmission not possible made when normal transmission was unable to be performed.

At step 116 the security monitoring app 38 turns the reception flag OFF, turns the timer count OFF, and then returns to step 100 to repeat the processing described above.

However, at step 118, the security monitoring app 38 determines whether or not there is a need to transmit a response instruction to the app. This determination is a determination made by the center transmission necessity determination function 42 as to whether or not there is a need for response instruction notification. For example, determination may be made as to whether or not the danger level of the security center transmission determination condition exceeds a predetermined response instruction determination threshold. Processing returns to step 100 to repeat the processing described above in cases in which this determination is negative; however, processing transitions to step 120 in cases in which this determination is affirmative. This enables a reduction in development costs as a result of aggregating determination functions by the final ECU 24 in the security monitoring app 38. Here, the determination at step 118 may, separately from the security center transmission determination condition, be a determination using similar pre-prepared response instruction transmission determination conditions. Moreover, in the transmission determination condition, at least one of a number of attack times received or a communication non-execution duration with the security center 12 may be included in the transmission determination condition. For example, a response instruction may be transmitted in cases in which the number of times of attack exceeds a threshold number of times of attack stored by the security monitoring app 38. In cases in which a response instruction is not transmitted at the threshold or below, a communication non-execution duration with the security center 12 is checked periodically, and the response instruction is transmitted in cases in which the communication non-execution duration has reached the predetermined threshold or greater. Including the number of attack times in the transmission determination condition enables determination of danger level by frequency of attack in cases in which there is a malfunction of the wireless communication function with the security center 12, and enables a serious state to be avoided. Including the duration for which no communication has been made with the security center 12 in the transmission determination condition enables high accuracy determination of a non-natural state, such as an intentional malfunction or a communication-severed state of wireless communication relative to the security center 12.

At step 120, the security monitoring app 38 transmits the response instruction to the app, and processing returns to step 100 to repeat the processing described above. Namely the response instruction is transmitted to the app by the response instruction transmission function 46. Note that a single or plural items of the security event information may be transmitted to this ECU 24 or the app instead of the transmitting the response instruction. Moreover, the app or this ECU 24 includes each determination condition predetermined for the security center determination conditions, as illustrated in the example in FIG. 7. Instead of the response instruction being transmitted to the app or this ECU 2, the response instruction may be transmitted as bus units or by broadcasting. The transmission of the response instruction and the security event information to the app may, as well as transmission to this ECU 24 of security events that have occurred, include transmission of security events that have occurred to another ECU 24 other than this ECU 24. For example, security events occur at upstream ECUs 24, and response instructions and security event information may be transmitted to downstream ECUs 24.

In this manner, in the present exemplary embodiment the security monitoring app 38 notifies at least one out of a response instruction according to the security event information, or the security event information even when unable to communicate with the security center 12, enabling a dangerous state in relation to security to be avoided.

Note that the security monitoring app 38 may also append and transmit an authentication code using a held common key when transmitting the at least one out of the response instruction or the security event information. The app or the ECU 24 on the reception side uses the held common key to, as message authentication, perform confirmation of the completeness of the content of the received response instruction. Note that instead of using a message authentication system by common key, the information may be encrypted using a public key encryption system. Thus in this manner, appending an authentication code, or encryption using a public key encryption system enables a guarantee that the transmitter of the response instruction is from the security monitoring app 38 and that the transmitted information has not been tampered with.

Figure 8:
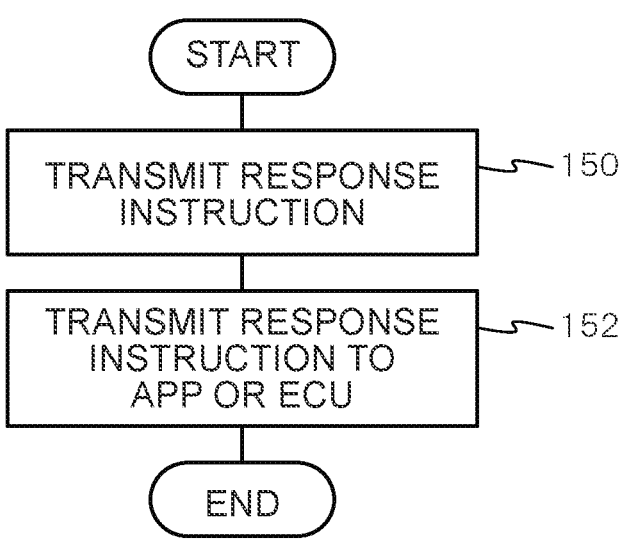
FIG. 8 is a flowchart illustrating an example of a flow of processing performed in an information processing system according to the present exemplary embodiment when a security monitoring app has received a response instruction from a security center.

Next, explanation follows regarding processing performed when the security monitoring app 38 has received the response instruction from the security center 12. FIG. 8 is a flowchart illustrating an example of a flow of processing in the information processing system 10 according to the present exemplary embodiment performed when the security monitoring app 38 has received a response instruction from the security center 12.

At step 150 the security monitoring app 38 receives the response instruction from the security center 12 using wireless communication, and then processing transitions to step 152. Determination may be made as whether or not the response instruction is related to the security event information already transmitted to the security center 12 as a reception condition of the response instruction, and any non-related response instructions may be discarded.

At step 152 the security monitoring app 38 transmits the received response instruction to the app or the ECU 24, thereby completing a cycle of processing.

Figure 9:
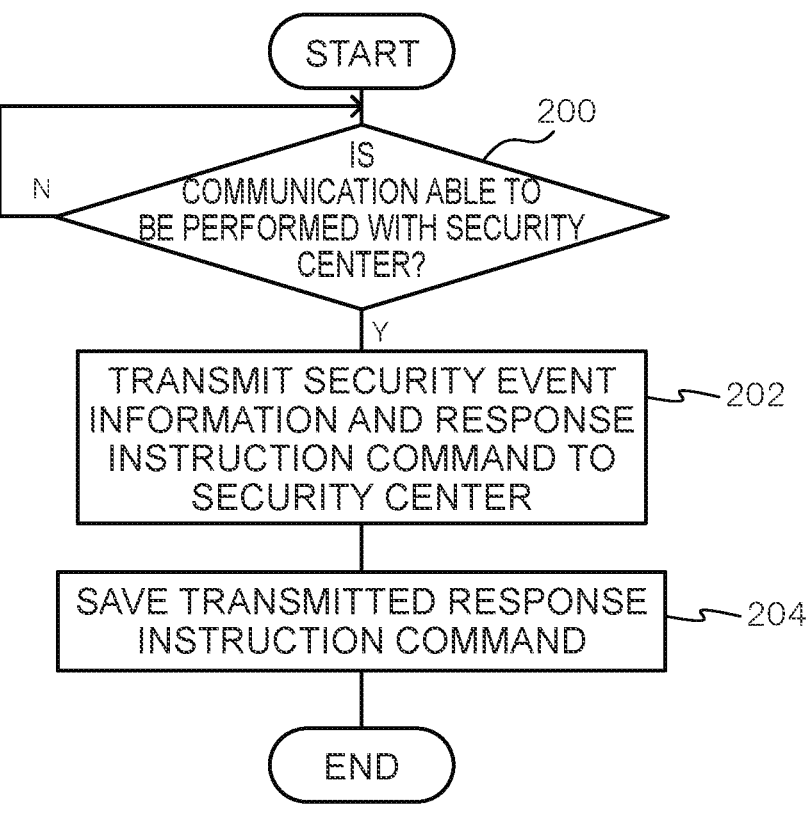
FIG. 9 is a flowchart illustrating an example of a flow of processing in an information processing system according to the present exemplary embodiment when a response instruction is received from a security center after a security monitoring app has transmitted a response instruction to the app or the ECU.

Next, description follows regarding processing performed when the response instruction is received from the security center 12 after the security monitoring app 38 has transmitted the response instruction to the app or the ECU 24. FIG. 9 is a flowchart illustrating an example of a flow of processing in the information processing system 10 according to the present exemplary embodiment when a response instruction is received from the security center 12 after the security monitoring app 38 has transmitted the response instruction to the app or the ECU 24.

At step 200 the security monitoring app 38 determines whether or not communication is able to be performed with the security center 12. This determination is by periodic checking as to whether or not communication is able to be performed with the security center 12 after the security monitoring app 38 has transmitted the response instruction to the app or the ECU 24. Standby is adopted when this determination is affirmative and processing transitions to step 202.

At step 202 the security monitoring app 38 transmits the security event information, and a response instruction command transmitted by the security monitoring app 38 to the security center 12, and processing transitions to step 204. Namely, after the security event information has been transmitted to the security center 12 by the response instruction transmission function 46, a response instruction command is transmitted to the security center 12 in cases in which wireless communication with the security center 12 has become possible, as information indicating the response processing that was executed. Information to identify the app or the ECU 24 as the destination of the response instruction, instruction execution timestamp information, a reply result of the instruction receiving ECU 24, and the like is included in the response instruction command for transmission to the security center 12. This enables determination at the security center 12 side of the appropriateness of response processing to the security event by the response instruction executed in the vehicle 14. There is no need to transmit a response instruction from the security center 12 to the vehicle 14 in cases in which the appropriateness can be determined.

At step 204, the security monitoring app 38 stores the transmitted response instruction command in non-volatile memory or the like, thereby completing a cycle of processing.

Figure 10:
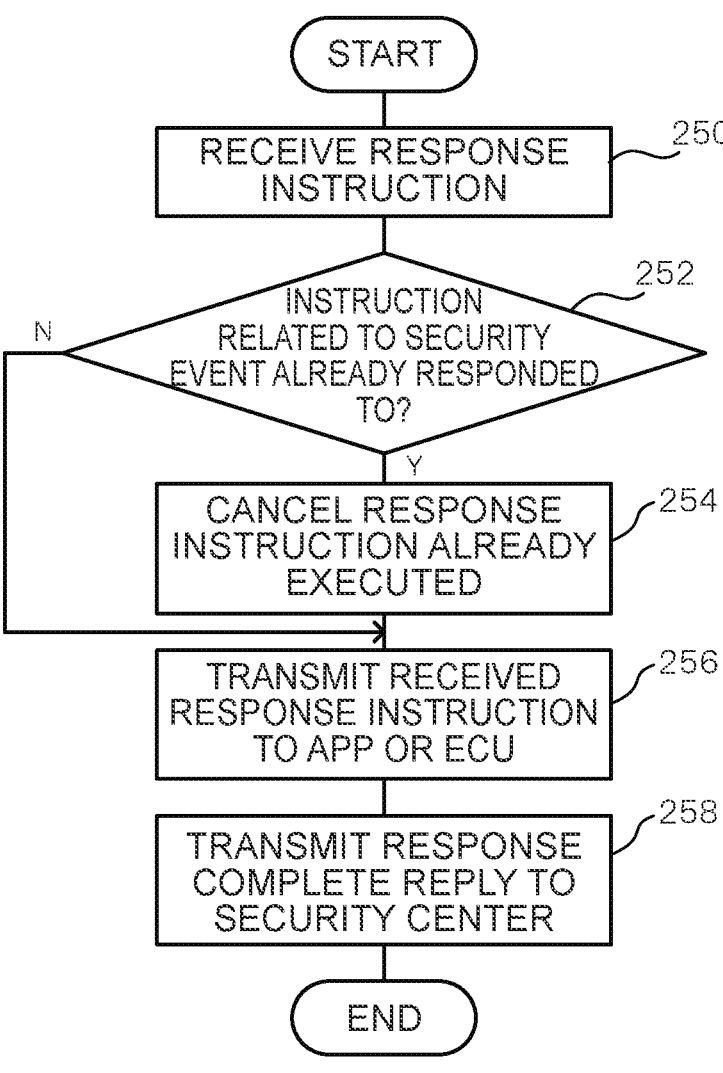
FIG. 10 is a flowchart illustrating an example of a flow of processing in an information processing system according to the present exemplary embodiment performed when the security monitoring app cancels a response instruction already transmitted.

Next, description follows regarding processing performed after restoring communication between the security center 12 and the security monitoring app 38 when a response instruction already transmitted is canceled. FIG. 10 is a flowchart illustrating an example of a flow of processing performed in the information processing system 10 according to the present exemplary embodiment when the security monitoring app 38 cancels a response instruction already transmitted.

At step 250 the security monitoring app 38 receives the response instruction from the security center 12 and processing transitions to step 252. Namely, a response instruction command is received as response instruction information from the security center 12 after transmission of the response instruction command to the security center 12.

At step 252, the security monitoring app 38 determines whether or not the instruction is related to a security event already responded to. This determination is determination as to whether or not the content of the response instruction received from the security center 12 is similar to the response instruction command held by the security monitoring app 38. Processing transitions to step 254 in cases in which this determination is affirmative, and processing transitions to step 256 in cases in which this determination is negative.

At step 254 the security monitoring app 38 cancels the response instruction already executed, and processing transitions to step 256. Namely, the response instruction corresponding to the security event information transmitted by the response instruction transmission function 46 is cancelled by the response instruction cancel function 54. Instead of transmitting a command meaning cancel, a mode may be adopted in which the response instruction received from the security center 12 is transmitted to the app or the ECU 24 for overwriting the response instruction already transmitted by the security monitoring app 38.

At step 256 the security monitoring app 38 transmits the received response instruction to the app or the ECU 24 and processing transitions to step 258.

At step 258 the security monitoring app 38 transmits a response complete reply to the security center 12 thereby completing a cycle of processing.

Explanation follows regarding a specific example of processing when canceling the response instruction already transmitted of FIG. 10 described above.

For example, consider a case in which a multimedia ECU and an ITS ECU are connected to the Ether SW 26. Security event information is received by the security monitoring app 38 respectively from the multimedia ECU and the Ether SW 26. The danger level is determined to be high when a large number of authentication errors have been detected at the access point function of the local area network (LAN) of the multimedia ECU, and although a trial transmission of the security event information has been made to the security center 12, communication is not able to be made with the security center 12 and transmission fails. The security monitoring app 38 determines from the danger level a need for such instruction, and a response instruction to disable the access point function of the wireless LAN is transmitted to the multimedia ECU. Then when the wireless communication state becomes good and communication with the security center 12 is restored, the ability to communicate is detected by periodic checking the communication state with the security center 12 after the security monitoring app 38 has transmitted the response instruction. The security event information is transmitted to the security center 12. Determination is made on the security center 12 side that the multimedia ECU is not in jeopardy, and the connected ITS ECU is determined not to be in jeopardy from the security event information of the Ether SW 26 and from known vulnerability information and the like held on the security center 12 side. An instruction to cancel the response instruction already transmitted to the multimedia ECU by the security center 12, and a response instruction to disable the port of the Ether SW 26 to which the ITS ECU is connected, are received. Note that instead of the cancelation instruction being a cancel instruction for the response instruction, a new response instruction to enable the access point function may be issued.

In the present exemplary embodiment, when the ability to perform communication with the security center 12 has been detected, the ability to perform correct communication with the security center 12 may be verified prior to transmitting the security event information and the response instruction command to the security center 12. This enables the avoidance of the wireless communication ECU 24A being tampered with and an interfering dummy program being installed to mimic the security center 12 so as to release a response instruction already executed in the vehicle. For example, the security monitoring app 38 may transmit a command to confirm the normality of the wireless communication ECU 24A in order to confirm whether or not the software in the wireless communication ECU 24A has been overwritten. A random number is included in this command, encryption is performed by the public key encryption function 48 using the held common key, and whether or not there is a match to the received code is verified. In cases in which there is a secure boot function in the wireless communication ECU 24A, the correctness of software may be verified by the software tamper detection function 62 when the wireless communication ECU 24A is started up, such that start up is not performed in cases such as those in which there is abnormal software present. At start up the wireless communication ECU 24A may check the period of time during which communication with the security center 12 is not performed, such that confirmation that the software has not been overwritten is only given in cases in which this period of time is a predetermined duration or greater. Thus when there is a desire to suppress the processing load on the wireless communication ECU 24A, this approach enables a tamper check to be performed only in cases in which a particular condition applies, such as cases in which a wireless communication state has continued for a given period of time that would enable tampering, or greater.

Moreover, an application program such as of the security monitoring app 38 or the like of the present exemplary embodiment may be installed over the air (OTA) to the security monitoring ECU 20 or another of the ECUs 24. The response instruction according to the security events may also be transmitted and received OTA to and from the security monitoring ECU 20 or another of the ECUs 24.

Note that although explanation in the exemplary embodiment described above is of an example in which the security monitoring app 38 operates on a single security monitoring ECU 20, there is no limitation thereto. For example, the processing performed by the security monitoring app 38 (the processing of FIG. 6 and FIG. 8 to FIG. 10) may be executed by coordination across plural ECUs 24.

Moreover, although an example has been described in which the processing performed in the SOC 22 of the security monitoring ECU 20 in each of the exemplary embodiments described above is software processing performed by execution of a program, there is no limitation thereto. For example, the processing may be performed by hardware, such as by a graphics processing unit (GPU), an application specific integrated circuit (ASIC), or a field programmable gate array (FPGA). Or processing may be performed by a combination of both software and hardware. In cases in which the processing is performed by software, a program may be distributed stored on various types of storage media.

Furthermore, the present disclosure is not limited by the description above, and in addition thereto obviously various modifications may be implemented within a scope not departing from the spirit of the present disclosure.

What is claimed is:

1. An information processing device, comprising a processor configured to:

acquire security event information for a vehicle from another information processing device installed in the vehicle; and in cases in which wireless communication with a security center located externally of the vehicle cannot be performed, notify a destination inside the vehicle of at least one of (i) a response instruction, which is predetermined according to the security event information, and (ii) the security event information, wherein the processor is configured to:

after providing notification to the destination inside the vehicle of the at least one of (i) the response instruction and (ii) the security event information, cause transmission of the security event information to the security center in cases in which the wireless communication with the security center has become possible; and (a) receive response instruction information corresponding to the security event information from the security center, and (b) cancel the response instruction and provide notification to the destination inside the vehicle of the response instruction information in cases in which the received response instruction information differs from the response instruction.

2. The information processing device of claim 1, wherein the information processing device itself and the other information processing device are electronic control units installed in the vehicle.

3. The information processing device of claim 1, wherein the processor is configured to:

determine whether or not to transmit the acquired security event information to the security center; and notify the destination inside the vehicle of the at least one of (i) the response instruction and (ii) the security event information, in cases in which the wireless communication with the security center cannot be performed when the processor has determined to transmit the security event information to the security center.

4. The information processing device of claim 3, wherein the processor is configured to:

acquire a plurality of items of the security event information from a plurality of the other information processing devices; and determine whether or not to transmit the security event information to the security center based on the plurality of items of security event information.

5. The information processing device of claim 3, wherein the processor is configured to check whether or not it is possible to perform the wireless communication with the security center in cases in which the processor has determined to transmit the security event information.

6. The information processing device of claim 3, wherein the processor is configured to cause transmission of the security event information to the security center in cases in which the processor has determined to transmit the security event information.

7. The information processing device of claim 6, wherein the processor is configured to cause transmission of the security event information via an electronic control unit including a wireless communication function.

8. The information processing device of claim 7, wherein the processor is configured to monitor for tampering with the electronic control unit including the wireless communication function in cases in which the wireless communication with the security center has become possible.

9. The information processing device of claim 8, wherein the processor monitors for the tampering in cases in which a duration for which the wireless communication cannot be performed with the security center is equal to or greater than a predetermined duration.

10. The information processing device of claim 8, wherein the processor is configured to not start the electronic control unit including the wireless communication function in cases in which the tampering with the electronic control unit including the wireless communication function has been detected.

11. The information processing device of claim 1, wherein the processor is configured to make a determination regarding whether or not to perform notification to the destination inside the vehicle in cases in which the wireless communication with the security center cannot be performed.

12. The information processing device of claim 11, wherein the processor uses a number of attack times to make the determination regarding whether or not to perform notification to the destination inside the vehicle.

13. The information processing device of claim 11, wherein the processor uses a communication non-execution duration with the security center to make the determination regarding whether or not to perform notification to the destination inside the vehicle.

14. The information processing device of claim 1, wherein the processor is configured to notify one of a plurality of the other information processing devices other than the another information processing device that issued the security event information, of the at least one of (i) the response instruction and (ii) the security event information.

15. The information processing device of claim 1, wherein the processor is configured to append an authentication code to the at least one of (i) the response instruction and (ii) the security event information when providing notification to the destination inside the vehicle of the at least one of (i) the response instruction and (ii) the security event information.

16. The information processing device of claim 1, wherein the processor uses a public key encryption system to encrypt the at least one of (i) the response instruction and (ii) the security event information when providing notification to the destination inside the vehicle of the at least one of (i) the response instruction and (ii) the security event information.

17. The information processing device of claim 1, wherein the processor is configured to, after providing the notification to the destination inside the vehicle of the at least one of (i) the response instruction and (ii) the security event information, cause transmission of information indicating executed response processing in cases in which the wireless communication with the security center has become possible.

18. An information processing system, comprising a plurality of control devices installed in a vehicle, wherein the plurality of control devices cooperate with each other to:
   acquire information about a security event that occurred in the vehicle; and
   in cases in which wireless communication with a security center located externally of the vehicle cannot be performed, perform processing to notify a destination inside the vehicle of at least one of (i) a response instruction, which is predetermined according to the security event information, and (ii) the security event information,
wherein the plurality of control devices:
   after providing notification to the destination inside the vehicle of the at least one of (i) the response instruction and (ii) the security event information, cause transmission of the security event information to the security center in cases in which the wireless communication with the security center has become possible; and
   (a) receive response instruction information corresponding to the security event information from the security center, and (b) cancel the response instruction and provide notification to the destination inside the vehicle of the response instruction information in cases in which the received response instruction information differs from the response instruction.

19. An information processing method in which a computer performs processing comprising:
   acquiring security event information for a vehicle from an information processing device installed in the vehicle; and
   in cases in which wireless communication with a security center located externally of the vehicle cannot be performed, notifying a destination inside the vehicle of at least one of (i) a response instruction, which is predetermined according to the security event information, and (ii) the security event information,
wherein the processing further comprises:
   after providing notification to the destination inside the vehicle of the at least one of (i) the response instruction and (ii) the security event information, causing transmission of the security event information to the security center in cases in which the wireless communication with the security center has become possible; and
   (a) receiving response instruction information corresponding to the security event information from the security center, and (b) canceling the response instruction and provide notification to the destination inside the vehicle of the response instruction information in cases in which the received response instruction information differs from the response instruction.

20. A non-transitory computer-readable recording medium storing an information processing program executable by a computer to perform processing, the processing comprising:
   acquiring security event information for a vehicle from an information processing device installed in the vehicle; and
   in cases in which wireless communication with a security center located externally of the vehicle cannot be performed, notifying a destination inside the vehicle of at least one of (i) a response instruction, which is predetermined according to the security event information, and (ii) the security event information, wherein the processing further comprises:

after providing notification to the destination inside the vehicle of the at least one of (i) the response instruction and (ii) the security event information, causing transmission of the security event information to the security center in cases in which the wireless communication with the security center has become possible; and (a) receiving response instruction information corresponding to the security event information from the security center, and (b) canceling the response instruction and provide notification to the destination inside the vehicle of the response instruction information in cases in which the received response instruction information differs from the response instruction.

21. An information processing device, comprising a processor configured to:

acquire security event information for a vehicle from another information processing device installed in the vehicle; and in cases in which wireless communication with a security center located externally of the vehicle cannot be performed, notify a destination inside the vehicle of at least one of (i) a response instruction, which is predetermined according to the security event information, and (ii) the security event information, wherein the processor is configured to:

cause transmission of the security event information via an electronic control unit including a wireless communication function; and monitor for tampering with the electronic control unit including the wireless communication function in cases in which the wireless communication with the security center has become possible.

22. The information processing device of claim 21, wherein the processor monitors for the tampering in cases in which a duration for which the wireless communication cannot be performed with the security center is equal to or greater than a predetermined duration.

23. The information processing device of claim 21, wherein the processor is configured to not start the electronic control unit including the wireless communication function in cases in which the tampering with the electronic control unit including the wireless communication function has been detected.

\* \* \* \* \*